United States Patent
Lepley et al.

(10) Patent No.: US 6,754,432 B2
(45) Date of Patent: Jun. 22, 2004

(54) COMPOSITE INSULATOR WITH AN OPTICAL FIBER GUIDED BETWEEN A METAL END-FITTING AND THE SUPPORT ROD

(75) Inventors: Damien Lepley, Vichy (FR); Eric Moal, Saint-Yorre (FR)

(73) Assignee: Sediver Societe Europeenne d'Isolateurs en Verre et Composite, Nanterre (FR)

( * ) Notice: Subject to any disclaimer, the term of this patent is extended or adjusted under 35 U.S.C. 154(b) by 92 days.

(21) Appl. No.: 10/153,177

(22) Filed: May 21, 2002

(65) Prior Publication Data

US 2003/0002842 A1 Jan. 2, 2003

(30) Foreign Application Priority Data

May 22, 2001 (FR) .............................................. 01 06703

(51) Int. Cl.[7] .................................................. G02B 6/00
(52) U.S. Cl. ...................................................... 385/147
(58) Field of Search ........................... 385/147; 174/139, 174/179; 324/96; 350/96.23

(56) References Cited

U.S. PATENT DOCUMENTS

| | | | |
|---|---|---|---|
| 4,610,033 A | | 9/1986 | Fox, Jr. |
| 4,717,237 A | * | 1/1988 | Austin .......................... 385/101 |
| 5,847,325 A | * | 12/1998 | Gagne .......................... 174/179 |
| 6,215,940 B1 | * | 4/2001 | Johnson ...................... 385/136 |

FOREIGN PATENT DOCUMENTS

| | | |
|---|---|---|
| EP | 0146845 | 12/1984 |
| EP | 0926516 | 6/1999 |

OTHER PUBLICATIONS

Patent Abstracts of Japan, vol. 018, No. 017 (E–1488) Jan. 12, 1994 & JP 05 258629 A (NGK Insulators LTD), Oct. 8, 1993.

* cited by examiner

*Primary Examiner*—John R. Lee
*Assistant Examiner*—Christopher M. Kalivoda
(74) *Attorney, Agent, or Firm*—Ware, Fressola, Van Der Sluys & Adolphson LLP

(57) ABSTRACT

A composite electrical insulator comprises a support rod generally of a composite material, two metal end-fittings each forming a socket in which a corresponding end of the support rod is inserted, at least one optical fiber placed on the outer periphery of the support rod, and an insulating outer coating surrounding the support rod and covering the optical fiber which has at least one end guided to the outside of the insulator through an end-fitting via a groove formed in the inside surface of the socket of the end-fitting, said groove opening to the outer periphery of the support rod, and via a duct extending said groove and opening to the outside of the end-fitting.

5 Claims, 1 Drawing Sheet

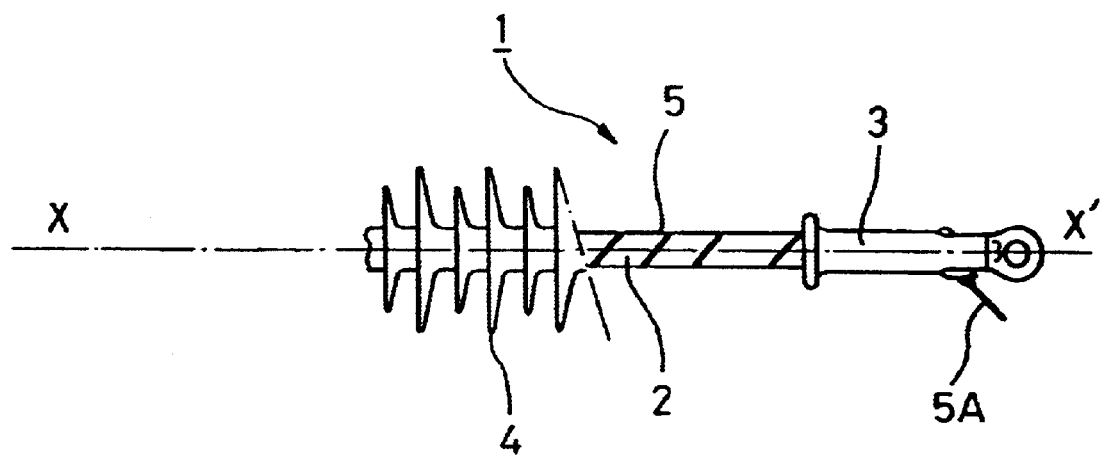
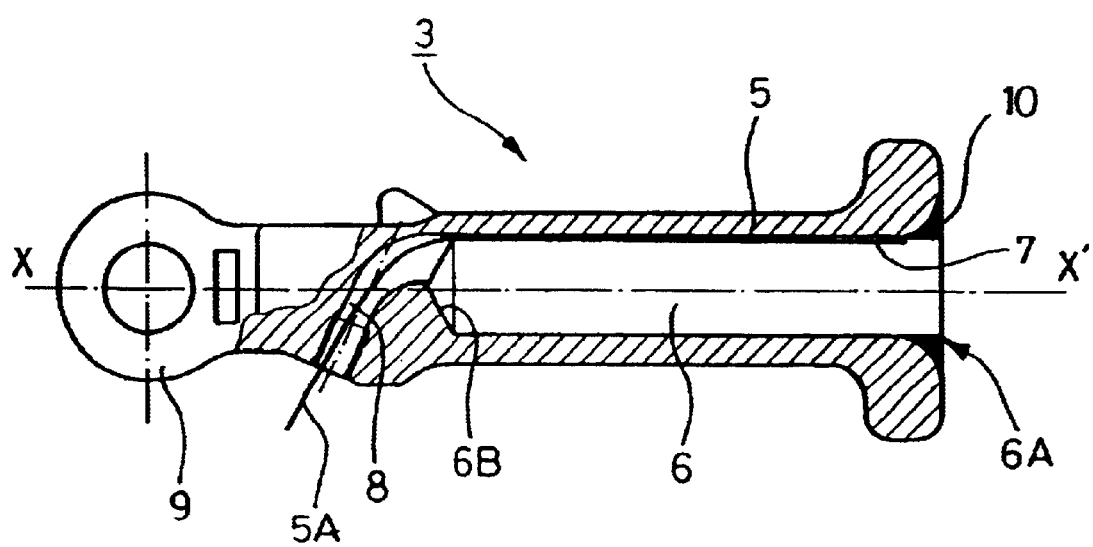

COMPOSITE INSULATOR WITH AN OPTICAL FIBER GUIDED BETWEEN A METAL END-FITTING AND THE SUPPORT ROD

CROSS REFERENCE TO RELATED APPLICATION

Priority is claimed from French application no. 01 06703 filed May 22, 2001.

The invention relates to composite electrical insulators for substations or for medium or high voltage lines and fitted with optical fibers, and more particularly the invention relates to a composite electrical insulator comprising a support rod generally of composite material, two metal end-fittings each forming a socket in which a corresponding end of the support rod is inserted, at least one optical fiber placed on the outer periphery of the support rod, and an insulating outer coating surrounding the support rod and covering the optical fiber which has at least one end guided to the outside of the insulator through an end-fitting.

BACKGROUND OF THE INVENTION

Patent document EP-0 926 516 discloses such a substation composite electrical insulator. In that known insulator, the optical fiber is stuck to the outer periphery of the support rod and each end of the optical fiber is guided to the outside of the insulator through an end-fitting via an annular groove formed in the outside surface of a cylindrical portion of the end-fitting surrounded by an outer annular portion of the end-fitting and then by a duct passing through the annular portion and leading to outside the end-fitting. Such an arrangement is complicated to implement, gives rise to problems of sealing the insulator along the optical fiber, and is not suitable for insulators of small diameter, such as line insulators.

OBJECT AND SUMMARY OF THE INVENTION

The object of the invention is to remedy those drawbacks.

To this end, the invention provides a composite electrical insulator comprising a support rod generally of composite material, two metal end-fittings each forming a socket in which a corresponding end of the support rod is inserted, at least one optical fiber placed on the outer periphery of the support rod, and an insulating outer coating surrounding the support rod and covering the optical fiber which has at least one end guided to the outside of the insulator through an end-fitting, wherein said end of the optical fiber is guided through the end-fitting by a groove formed in the inside surface of the socket of the end-fitting, said groove opening to the outer periphery of the support rod, and by a duct extending said groove and opening to the outside of the end-fitting. Consequently, in the insulator of the invention, the optical fiber is guided in part between the rod and the metal end-fitting, thus making it possible to design an end-fitting having a small outside diameter. The groove and the duct can easily be made at particularly low cost by casting without any machining. The insulator is easily sealed by plugging the duct with an insulating gel or with adhesive.

In a particular embodiment of the insulator of the invention, the groove is rectilinear and extends along the longitudinal axis of the socket of the end-fitting which can thus be fixed onto the support rod by mechanical crimping. The duct forms a bend so as to open out through a side of the metal end-fitting, with the radius of curvature of the duct being adapted to the mechanical characteristics of the optical fiber. The groove flares towards the outside edge of the mouth of the socket in the end-fitting so that the optical fiber which is generally wound helically around the support rod can be inserted into the groove without being damaged. A gasket of adhesive surrounding the rod is placed against the outside edge of the mouth of the socket in the end-fitting in order to close the groove. As a result, the outside coating, generally made of elastomer, does not penetrate into the groove while it is being applied to the support rod, e.g. by injection molding. This eliminates any risk of the optical fiber being damaged.

BRIEF DESCRIPTION OF THE DRAWING

The invention and its characteristics and advantages are described in greater detail in the following description given with reference to the figures mentioned below.

FIG. 1 is a fragmentary diagrammatic view of an embodiment of a composite insulator of the invention. In this figure, a portion of the covering surrounding the support rod has been removed so as to reveal the optical fiber placed inside the insulator.

FIG. 2 is a longitudinal section view through a metal end-fitting for the insulator of the invention.

MORE DETAILED DESCRIPTION

FIG. 1 shows a portion of a composite electrical line insulator 1 of the invention comprising a support rod 2 made of an electrically insulating composite material, generally a composite of epoxy resin and glass fiber. The support rod 2 having a longitudinal axis XX' is constituted in this case by a small diameter pole, but the invention also covers a composite electrical insulator for a substation in which the support rod is in the form of a tube. The insulator 1 has two metal end-fittings each forming a socket having a corresponding end of the support rod 2 inserted therein. FIG. 1 shows a single metal end-fitting 3. The support rod 2 is surrounded by an insulating outer coating 4 which forms fins in conventional manner. The outer coating 4 is generally made of elastomer that is injected onto the support rod. The insulator 1 also has at least one optical fiber 5 placed on the outer periphery of the support rod 2, this optical fiber being covered by the coating 4 and having at least one end 5A which is guided to outside the insulator through the metal end-fitting 3 in order to be connected to another optical fiber, a sensor, or a measurement unit. In FIG. 1, the optical fiber 5 is wound helically around the support rod 2 and is fixed thereto, preferably by means of adhesive, e.g. using the same epoxy resin mixture as constitutes the composite.

In FIG. 2, the metal end-fitting 3 forms a cylindrical socket 6 on the longitudinal axis XX' with a corresponding end of the support rod 2 being inserted therein. The end 5A of the optical fiber is guided to the outside of the insulator 1 between the support rod 2 and the metal end-fitting 3 via a shallow groove 7 formed in the inside surface of the socket 6 of the end-fitting, this groove opening to the outer periphery of the support rod 2. In the example of FIG. 2, the groove 7 is rectilinear and extends along the axis XX' from the outside edge of the mouth 6A of the socket to the end wall 6B of the socket where it is extended by a duct 8 formed completely within the end-fitting 3 and in turn opening to the outside of the end-fitting 3.

As can be seen in FIG. 2, the optical fiber 5 passes inside the duct 8 so as to extend to the outside of the insulator. The duct 8 forms a bend so as to open out to the side of the end-fitting 3 diametrically opposite from the side where the groove 7 is formed. With this arrangement, the end-fitting 3 can be provided at its free end with a suspension system such as a ring 9. As can be seen in FIG. 2, the duct 8 has an inside diameter that tapers going from the inside of the socket 6 towards the outside of the end-fitting 3, the opening of the duct 8 through the side of the end-fitting 3 optionally receiving an optical connector to which the end 5A of the optical fiber is connected. The groove 7 also flares over the outside edge of the mouth 6A of the socket so as to make it easier to put the optical fiber into place on the support rod 2 and in the groove 7 without damage.

To manufacture the composite insulator of the invention, the end-fittings such as 3 are secured to the support rod 2 by mechanical crimping, for example. Thereafter, the optical fiber 5 is placed on the outer periphery of the support rod 2 with each end of the optical fiber 5 being passed through the groove 7 and the duct 8 of each end-fitting. The optical fiber thus extends through the side of each end-fitting. Prior to placing the outer coating 4 on the support rod 2, a gasket 10 of adhesive is placed around the support rod 2 against the outside edge of the mouth 6A of the socket in each of the end-fittings so as to close off the groove 7 in the end-fitting. Thereafter, the outer coating 4 is put into place around the support rod 2, generally by injection, without any risk of it penetrating into the grooves 7 of the end-fittings. The outer coating 4 is then vulcanized. The duct 8 is finally closed by a gel or by adhesive so as to close off the insulator in leaktight manner.

As mentioned above, the invention applies to composite insulators for substations or for lines having a support rod that can be solid or hollow, together with one or more optical fibers placed on the support rod.

What is claimed is:

1. A composite electrical insulator comprising a support rod generally of composite material, two metal end-fittings each forming a socket in which a corresponding end of the support rod is inserted, at least one optical fiber placed on the outer periphery of the support rod, and an insulating outer coating surrounding the support rod and covering the optical fiber which has at least one end guided to the outside of the insulator through an end-fitting, wherein said end of the optical fiber is guided through the end-fitting by a groove formed in the inside surface of the socket of the end-fitting, said groove opening to the outer periphery of the support rod, and by a duct extending said groove and opening to the outside of the end-fitting.

2. A composite electrical insulator according to claim 1, in which the groove is rectilinear and extends along the longitudinal axis of the socket of the end-fitting.

3. A composite electrical insulator according to claim 2, in which the duct forms a bend so as to open out through a side of the end-fitting.

4. A composite electrical insulator according to claim 1, in which the groove flares over the outside edge of the mouth of the socket in the end-fitting.

5. A composite electrical insulator according to claim 4, in which a gasket of adhesive surrounding the support rod is placed against the outside edge of the mouth of the socket in the end-fitting in order to close the groove.

* * * * *